Nov. 7, 1944.  C. V. LITTON  2,362,209

ULTRA-HIGH FREQUENCY RECEIVER

Filed July 13, 1940

INVENTOR.
CHARLES V. LITTON
BY RC Hopgood
ATTORNEY.

Patented Nov. 7, 1944

2,362,209

UNITED STATES PATENT OFFICE 2,362,209

ULTRA-HIGH-FREQUENCY RECEIVER

Charles V. Litton, Redwood City, Calif., assignor to International Standard Electric Corporation, New York, N. Y., a corporation of Delaware Application July 13, 1940, Serial No. 345,282

1 Claim. (Cl. 250—27)

This invention relates to ultra-high frequency tubes and circuits and more particularly to tubes using velocity modulation and adapted for amplification, detection and regenerative amplification and detection.

High frequency tubes which comprise built-in circuits have been provided wherein a stream of electrons is modified in velocity at one point, and then the modified velocity electron beam is allowed to traverse a given distance until the change in velocity causes a grouping of the electrons in the stream. Then a resonant circuit is provided to absorb the energy from the bunched electrons. Such tubes have been used as high frequency oscillation generators and amplifiers of high frequency energy.

According to my invention I provide additional circuits and structures with such tube systems for detecting signals, for regenerative amplification, or for oscillation generation or any desired combination of these functions.

According to one feature of my invention the detection of signals may be achieved by using a modulated high frequency wave to modify the velocity of an electron stream. The modified electron stream is then allowed to change its electron distribution due to the velocity change, and an absorbing resonant chamber is provided to extract energy from the grouped electrons. The electron beam after passing the resonant circuit has electrons therein modified in average velocity according to modulation signals. This velocity modified beam is then deflected by a suitable deflector and means is provided to respond to certain of the deflected electrons to produce a signal output in accordance with the modulation envelope.

According to a further feature of my invention an adjustable regenerative back coupling is provided between the resonant circuit and the input circuit so that regenerative amplification or oscillation generation may be accomplished.

Figure 1:
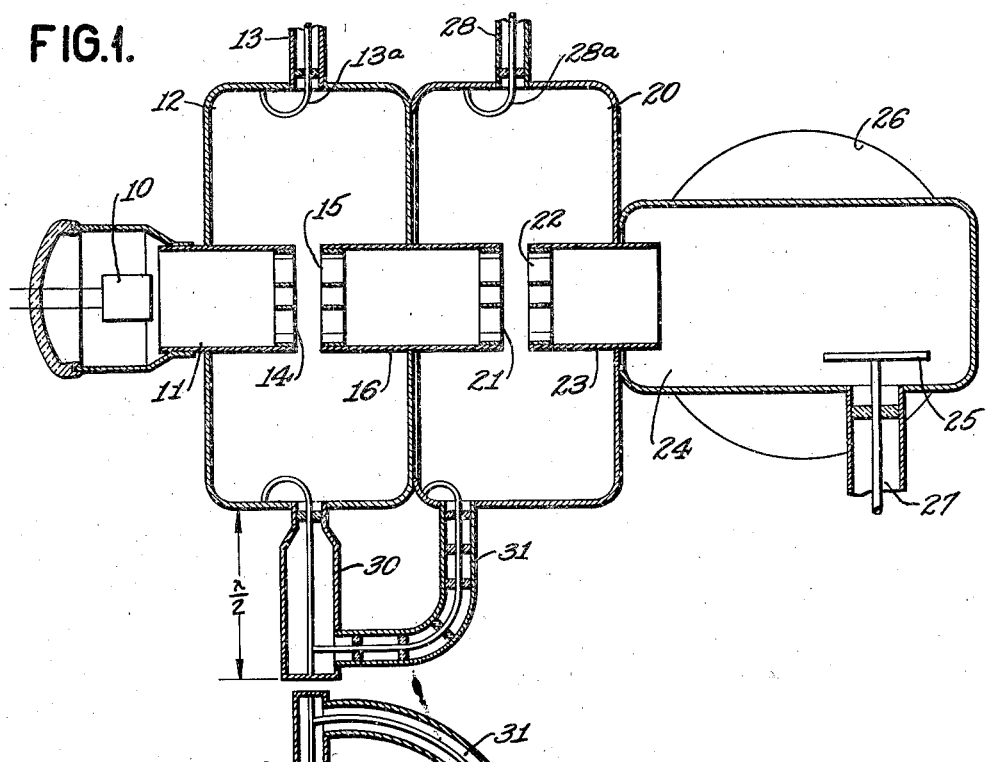
Figure 2:
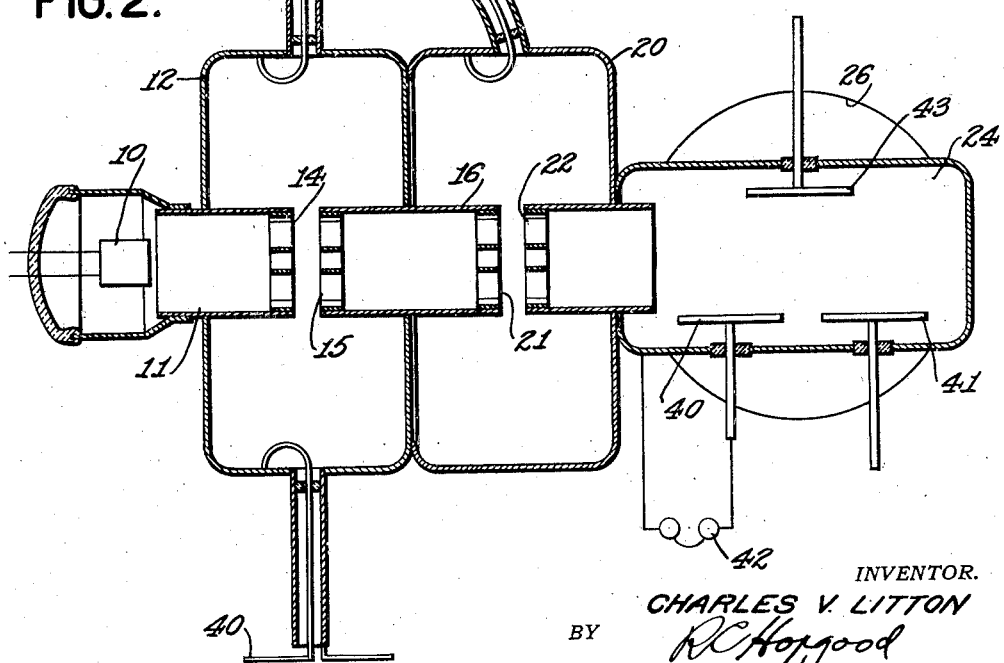

A better understanding of my invention and the features and objects thereof will be had from the complete description of a few preferred embodiments thereof made in connection with the accompanying drawing, in which Fig. 1 shows a preferred arrangement thereof in cross-section, and Fig. 2 shows diagrammatically an alternative modification.

In Fig. 1 is shown a tube having an electron emitting cathode 10 which emits a beam of electrons. These electrons pass through a guide tube 11 connected to a resonant circuit 12. This circuit is preferably tuned to the high operating frequency and constitutes a closed resonant chamber. Signal modulated energy is applied to resonant chamber 12 over a lead-in conductor 13 having a loop 13a inside of the chamber. The beam of energy as it passes through the chamber 12 is affected by grids 14, 15 so that the velocity of some of the electrons is accelerated and some are decelerated in accordance with the high frequency input. After this modification in velocity the electron beam passes through a tube 16 which is of sufficient length to permit the electrons which have been modified in velocity to form into groups or bunches. A second resonant chamber 20 is provided and is coupled to a pair of grids 21, 22. This second resonant chamber is tuned to operate at the same carrier frequency as circuit 12. As the electrons pass between grids 21, 22, energy is extracted therefrom in the resonant circuit 20. This extraction of the energy further modifies the velocity of the electrons by tending to slow down the average velocity of all of the electrons in the beam.

The electrons in the beam then pass on through tube 23 into a closed chamber 24. In chamber 24 is provided an electrode 25 which serves as an output electrode. Means are provided for deflecting all the electrons which enter the chamber 24 downwardly toward electrode 25. Preferably, a system such as coil 26 is provided to produce a magnetic field transverse of the chamber 24 which will then tend to deflect all of the electrons toward the lower part thereof. If desired a permanent magnet may be used in place of the electro-magnet. Preferably electrode 25 is raised to a slight positive potential so that some of the electrons entering chamber 24 are deflected downwardly toward it. In some cases the deflecting action of electrode 25 alone may be sufficient without further deflecting means. Since the electrons have been modified in velocity in accordance with a modulated carrier wave, the slowed electrons entering chamber 24 differ in velocity in accordance with the modulating signal. The slower velocity electrons will be deflected downwardly into contact with the walls of chamber 24 earlier than will the higher speed electrons. For this reason only the higher speed electrons will reach output electrode 25. Accordingly, a detected component will be received at electrode 25 and may be conducted over line 27 to a receiving reproducer or to a further low frequency amplifier. The input of such amplifier may be connected between conductor 27 and chamber 24.

While it is preferred to utilize a magnetic field for causing the deflection of the electrons, it is clear that other known deflecting means, such as electrostatic plates, may be provided if desired.

It is clear from the above description that the arrangement provides a high frequency amplifier and a detector. However, it may be desirable at times to use some regeneration in order to obtain greater amplification. For such regenerative action I provide a feedback circuit. This arrangement preferably comprises a section of transmission line 30 coupled to resonant chamber 12. Line 30 is preferably made one-half wave-length long or an odd multiple thereof and short circuited at one end. A flexible concentric conductor line 31 is coupled to resonant circuit 20 and is coupled with line 30 at an adjustable point spaced from the short circuited end of line 30. Thus, the amount of feedback may be controlled by controlling the coupling point between lines 31 and 30. For small adjustments the phase difference which will arise due to the change in the total length of line will be relatively unimportant. However, if it is desired to maintain exactly the phase relation, the feedback line 31 may be adjustable in length so that its length is changed in accordance with the position at which it is coupled with line 30.

While I have described this regenerative coupling means in connection with the detector circuit, as shown in Fig. 1, it is clear that the arrangement may be suitably applied for simple regenerative amplification of high frequency energy. To such end I provide a second output coupling means 28, coupled with resonant circuit 20. In the operation of this system the input energy from 13 serves to modify the velocity of the electron beam and the energy extracted in resonant circuit 20 is applied to output line 28. Regeneration is achieved through the coupled lines 30, 31.

In Fig. 2 is shown diagrammatically a modified tube arrangement somewhat similar to that shown in Fig. 1. In this circuit cathode 10, resonant chambers 12, 20, velocity modifying grids 14, 15, tube 16, energy extracting grids 21, 22, output chamber 24 and deflecting coil 26, correspond precisely with the corresponding elements described in detail in connection with Fig. 1. As an input circuit for chamber 12, I have illustrated a dipole antenna 40. It is clear that such a dipole may be equally well used as the input circuit coupled to line 13 in Fig. 1. In the output chamber 24 are provided two plates 40, 41, arranged at different points so that the slow moving electrons will be deflected onto plate 40 and the high speed electrons will be deflected to plate 41. A receiving arrangement 42 is shown coupled directly between plate 40 and the conducting envelope of chamber 24. This arrangement utilizes the low velocity electrons for the detection instead of the high velocity electrons, as provided in the circuit of Fig. 1. It is clear, however, that the receiver could be coupled to plate 41 instead of plate 40, if desired. Furthermore, by coupling an amplifier arrangement in push-pull to plates 40, 41, and connecting the mid-point of the input on the casing of chamber 24, push-pull output of the detected waves may be had. Also, it is clear that in place of the deflecting coil 26, the electrons may be deflected by positive potential applied to plates 40, 41. An additional deflecting plate 43 may also be arranged and supplied with a negative potential so as to deflect the electrons downwardly toward plates 40 and 41.

It should be understood that the various structural modifications illustrated in Fig. 2 may be applied to the structure shown in Fig. 1, if desired, in place of the arrangements shown therein or in addition thereto.

If it is desired to have a regeneration in the simplified signals, transmission lines 30, 31, corresponding to the similar arrangement shown in Fig. 1, may be provided.

It is also clear that the system if adjusted for oscillation may be used as an oscillating detector and will serve to produce amplified detected output energy or may be used simply as an oscillator.

While I have described the operation of my invention in connection with the preferred embodiments illustrated in Figs. 1 and 2, it is clear that other modifications may be provided without departure from the spirit of my invention. For example, it is clear that the detecting circuit as outlined herein may be achieved even though the tuned circuits 12 and 20 constitute other forms of arrangements than closed resonant chambers. Also the regenerative feedback feature may be applied to other types of systems wherein oscillating circuits other than closed chambers are used. What I consider my invention and desire to secure protection upon is embodied in the accompanying claim.

What is claimed is:

A high frequency tube arrangement comprising means for producing a stream of electrons traveling at a given average velocity, an input circuit for modifying the velocity of electrons in said stream in accordance with modulated high frequency waves, means for allowing said modified electrons to form groups in said beam, resonant circuit means for extracting energy from said electron groups thereby causing a slowing down of the electrons in said beam, means for deflecting said slowed electrons in a given direction, means arranged in the path of resulting deflected electrons of a certain velocity for producing an output current, said last-mentioned means comprising an electrode disposed substantially longitudinally of said stream of electrons and displaced from the axis thereof, said electrode being disposed in a conducting envelope, and having a direct coupling with said envelope, and a signal responsive device included in said coupling.

CHARLES V. LITTON.